US011480626B1

(12) United States Patent
Sarwat et al.

(10) Patent No.: US 11,480,626 B1
(45) Date of Patent: Oct. 25, 2022

(54) SYSTEMS AND METHOD FOR TESTING BATTERY MANAGEMENT SYSTEMS

(71) Applicants: Arif I. Sarwat, Miami, FL (US); Asadullah Khalid, Miami, FL (US); Alexander Stevenson, Miami, FL (US)

(72) Inventors: Arif I. Sarwat, Miami, FL (US); Asadullah Khalid, Miami, FL (US); Alexander Stevenson, Miami, FL (US)

(73) Assignee: THE FLORIDA INTERNATIONAL UNIVERSITY BOARD OF TRUSTEES, Miami, FL (US)

( * ) Notice: Subject to any disclaimer, the term of this patent is extended or adjusted under 35 U.S.C. 154(b) by 0 days.

(21) Appl. No.: 17/656,807

(22) Filed: Mar. 28, 2022

(51) Int. Cl.
*G01R 31/40* (2020.01)
*H02J 7/00* (2006.01)
*G06F 30/20* (2020.01)
*G01R 31/396* (2019.01)

(52) U.S. Cl.
CPC .......... *G01R 31/40* (2013.01); *G01R 31/396* (2019.01); *G06F 30/20* (2020.01); *H02J 7/0014* (2013.01); *H02J 7/0048* (2020.01)

(58) Field of Classification Search
CPC ..... G01R 31/40; G01R 31/396; H02J 7/0048; H02J 7/0014
See application file for complete search history.

(56) References Cited

U.S. PATENT DOCUMENTS 5,428,560 A * 6/1995 Leon ..................... G01R 31/36
700/298
6,016,047 A * 1/2000 Notten ................. G01R 31/374
320/128

FOREIGN PATENT DOCUMENTS

CN 113985296 A * 1/2022

* cited by examiner

*Primary Examiner* — Bryan Bui
(74) *Attorney, Agent, or Firm* — Saliwanchik, Lloyd & Eisenschenk

(57) ABSTRACT

Testbeds for battery management systems (BMSs) and/or batteries, as well as methods of using the same, are provided. A testbed can be a control-hardware-in-the-loop (CHIL) testbed and can include a simulation bench including a battery cell simulator, a temperature simulator, and/or a real-time simulator. The simulator bench can further include a programmable power supply, a relay, a resistor, and/or a communication protocol.

17 Claims, 15 Drawing Sheets

| Models | Components | | | | Input | Variable Functions | Battery Types Supported | Simulation Software Used |
|---|---|---|---|---|---|---|---|---|
| | Internal Resistances | Diodes | Capacitances | DC Sources | | | | |
| Rint / Simple Battery Model [22,32–36] | $R_0$ | - | - | Current | OCV and $R_0$ | - | | |
| Linear Model [27,29] | $R_0, R_{sd}$ | 2 | - | Voltage, Current | $R_0, R_{sd}, OCV, SOC, I_L$ | $OCV(SOC)$ | Lithium | PLECS |
| NREL SAFT 2-Capacitance / SAFT RC Model [22,29–31] | $R_0, R_p, R_s$ | - | $C_b, C_s$ | Current | $R_s, R_p, R_0, R_{sd}, V[C_b], V[C_s], I_L$ | $R_p, R_s, R_0(SOC), OCV(SOC), I_L(t)$ | Lithium | Advisor |
| | | | | | | | Lithium | Matlab, Pspice, Advisor |
| Thevenin Models and their Derivatives | | | | | | | | |
| Basic Thevenin Model [22,32–39] | $R_0, R_{T1}$ | - | $C_{T1}$ | Voltage, Current | $C_{T1}, R_{T1}, R_0, V[C_{T1}], OCV, SOC$ | $I_L(t)$ | Lithium, Lead-Acid, Nickel Metal Hydride | Matlab, Pspice |
| Dual Polarisation/ Second Order Model [22,33,40,41] | $R_0, R_{T1}, R_{T2}$ | - | $C_{T1}, C_{T2}$ | Voltage, Current | $R_0, R_{T1}, R_{T2}, C_{T1}, C_{T2}, OCV, I_L$ | $I_L(t)$ | Lithium | PSCAD, Matlab |
| First Order Model / Modified Thevenin Model [23,42,43] | $R_0, R_{T1}$ | - | $C_{T1}$ | Voltage, Current | $C_{T1}, R_{T1}, R_0, V[C_{T1}], OCV, SOC$ | $OCV(SOC), I_L$ | Lithium, Lead Acid | Advisor |
| Resistive Thevenin / Modified Simple Model / Modified Thevenin Model (Pang et al.) [23,24,25,27,35,44–46] | $R_0, R_{T1}$ | 2 | - | Voltage, Current | $R_0, R_{T1}, OCV, I_L$ | $I_L(t)$ | Lead Acid, Lithium | Advisor |
| Reactive Battery Model / Modified Thevenin Model (Pang et al.) [23,24,44] | $R_0, R_{T1}$ | - | $C_{T1}$ | Voltage, Current | $R_0, R_{T1}, V[C_{T1}], OCV, I_L$ | $I_L(t)$ | Lead Acid, Lithium | Advisor |
| $m^{th}$ Order Linear Parameter Varying / Electrical Analogue Model [35,47–50] | $R_0, R_{T1}, ... R_{Tm}$ | - | $C_{T1}, ... C_{Tm}$ | Voltage, Current | $R_0, R_{T1}, ... R_{Tm}, OCV, SOC, I_L$ | $OCV(SOC), R_0(SOC), R_{T1}(SOC), ... R_{Tm}(SOC), C_{T1}(SOC), ... C_{Tm}(SOC), I_L(t)$ | Lithium, Lead Acid, Nickel Metal Hydride | Matlab |

FIG. 8

| Simulation Number | Topology | Sequence | Target ΔV | CC | US06 Current Range |
|---|---|---|---|---|---|
| 1 | 6s1p | CC(7.5)-US(2)-CC(15)-US(3)-CC(22.5)-US(4)-CC(30)-US(5)-CC(37.5)-US(6)-CC(45)-US(7)-CC(52.5)-US(8)-CC(60) | 50mV | C/2 | ±1.5A |
| 2 | 6s2p | CC(7.5)-US(2)-CC(15)-US(3)-CC(22.5)-US(4)-CC(30)-US(5)-CC(37.5)-US(6)-CC(45)-US(7)-CC(52.5)-US(8)-CC(60)-US(1) [Repeat Twice] | 50mV | C/4 | ±1.5A |

Labels: CC(t), where t = charge time in minutes; US(N), where N = Number of US06 iterations; C/α = 2.75A/α C-rate, where α ∈ {2,4}.

FIG. 9

| Time (in seconds) | $t_0$ | $t_1$ | $t_2$ | $t_3$ |
|---|---|---|---|---|
| | 9207 | 18410 | 27620 | 36830 |
| Simulation ΔV | 0.451 | 0.314 | 0.204 | 0.036 |
| Orion BMS ΔV | 0.561 | 0.418 | 0.317 | 0.042 |

(a) 6s1p topology

FIG. 10(a)

| Time (in seconds) | $t_4$ | $t_5$ | $t_6$ | $t_7$ |
|---|---|---|---|---|
| Simulation $\Delta V$ | 18550 | 37110 | 55660 | 74220 |
| Orion BMS $\Delta V$ | 0.514 | 0.387 | 0.207 | 0.048 |
| | 0.584 | 0.502 | 0.317 | 0.049 |

(b) 6s2p interleaved topology

FIG. 10(b)

| Time (in seconds) | $t_0$ | $t_1$ | $t_2$ | $t_3$ |
|---|---|---|---|---|
| $\Delta SOC_{6s1p}$ | 9207 | 18410 | 27620 | 36830 |
| | 29.05% | 44.26% | 32.44% | 6.16% |
| Time (in seconds) | $t_4$ | $t_5$ | $t_6$ | $t_7$ |
| $\Delta SOC_{6s2p}$ | 18550 | 37110 | 55660 | 74220 |
| | 38.65% | 35.06% | 27.53% | 8.06% |

(c) Simulation versus Orion BMS for both topologies

FIG. 10(c)

SYSTEMS AND METHOD FOR TESTING BATTERY MANAGEMENT SYSTEMS

BACKGROUND

Lithium-ion (Li-ion) batteries are widely used in electric vehicle (EV) and microgrid applications, but they are susceptible to electrical instabilities brought on by slight chemical variations between individual batteries. These variations can cause significant voltage imbalances between series-connected batteries, leading to increased individual battery degradation and premature replacement or failure.

Batteries that have experienced capacity degradation through extensive cycling, which can be referred to as close-to-second life batteries, can be repurposed and have recently garnered more interest as industries and consumers continue to look for more sustainable alternatives for their energy needs. Close-to-second life batteries must go through a close inspection and assessment of their performance capability before a determination can be made on possible second life implementation. They also require strict monitoring and protection as chemical instabilities in these batteries are amplified compared to first-life batteries. Second-life batteries are often implemented for grid service applications after being used in EVs for the duration of their first life.

BRIEF SUMMARY

Embodiments of the subject invention provide novel and advantageous testbeds for battery management systems (BMSs) and/or batteries (e.g., lithium-ion (Li-ion) batteries), as well as methods of using the same. Embodiments of the subject invention also provide methods for simulating testing on a BMS and/or batteries, as well as methods for increasing the useful life of batteries (e.g., batteries connected to a BMS). A testbed can be a control-hardware-in-the-loop (CHIL) testbed and can include a simulation bench comprising a battery cell simulator, a temperature simulator, and/or a real-time simulator. The simulator bench can further include a programmable power supply (e.g., direct current (DC) power supply), a relay, a resistor, and/or a communication protocol (e.g., between one or more of the programmable power supply, the battery cell simulator, temperature simulator, and/or real-time simulator). The communication protocol can be, for example, Transmission Control Protocol/Internet Protocol (TCP/IP) and/or Controller Area Network (CAN).

In an embodiment, a system for testing a BMS having batteries connected thereto can comprise: a simulation bench configured to connect to the BMS; a processor; and a machine-readable medium in operable communication with the processor and having instructions stored thereon that, when executed by the processor, perform steps to generate results of a simulated BMS. The simulation bench can comprise: a battery cell simulator configured to connect to the BMS; a temperature simulator configured to connect to the BMS; a real-time simulator connected to the battery cell simulator and the temperature simulator; and a power supply (e.g., a programmable power supply, such as a programmable DC power supply) connected to the real-time simulator. The system can be a CHIL system. The simulation bench can further comprise a relay connected to the power supply of the simulation bench. The real-time simulator can be connected to the relay and providing a relay voltage supply digital signal thereto. The simulation bench can further comprise a resistor connected to the relay. The battery cell simulator can be connected to the real-time simulator via a (first) CAN. The temperature simulator can be connected to the real-time simulator via a (second) CAN (that can be the same as or different from the first CAN). The real-time simulator can be connected to the power supply of the simulation bench via TCP/IP. The real-time simulator can be connected to the machine-readable medium via TCP/IP.

In another embodiment, a method for testing a BMS having batteries connected thereto can comprise: providing a system as disclosed above (e.g., comprising the simulation bench, processor, and machine-readable medium); connecting the BMS having batteries connected thereto to the simulation bench; generating the results of the simulated BMS; collecting data from the BMS having batteries connected thereto; and comparing the results of the simulated BMS to the data collected from the BMS having batteries connected thereto. The method can further comprise displaying (e.g., on a display in operable communication with the processor) the results of the simulated BMS and the data collected from the BMS having batteries connected thereto.

BRIEF DESCRIPTION OF DRAWINGS

FIG. 8 shows a table of battery models. The numbers in brackets in the "models" column can be ignored.

FIG. 9 shows a table of implemented battery pack topologies and their corresponding specifications.

FIG. 10(a) shows a table of ΔV values for different timestamps for 6s1p topology.

FIG. 10(b) shows a table of ΔV values for different timestamps for 6s2p interleaved topology.

FIG. 10(c) shows a table of ΔV values for different timestamps for a simulation and an existing BMS, for both 6s1p topology and 6s2p interleaved topology.

DETAILED DESCRIPTION

Figure 1:
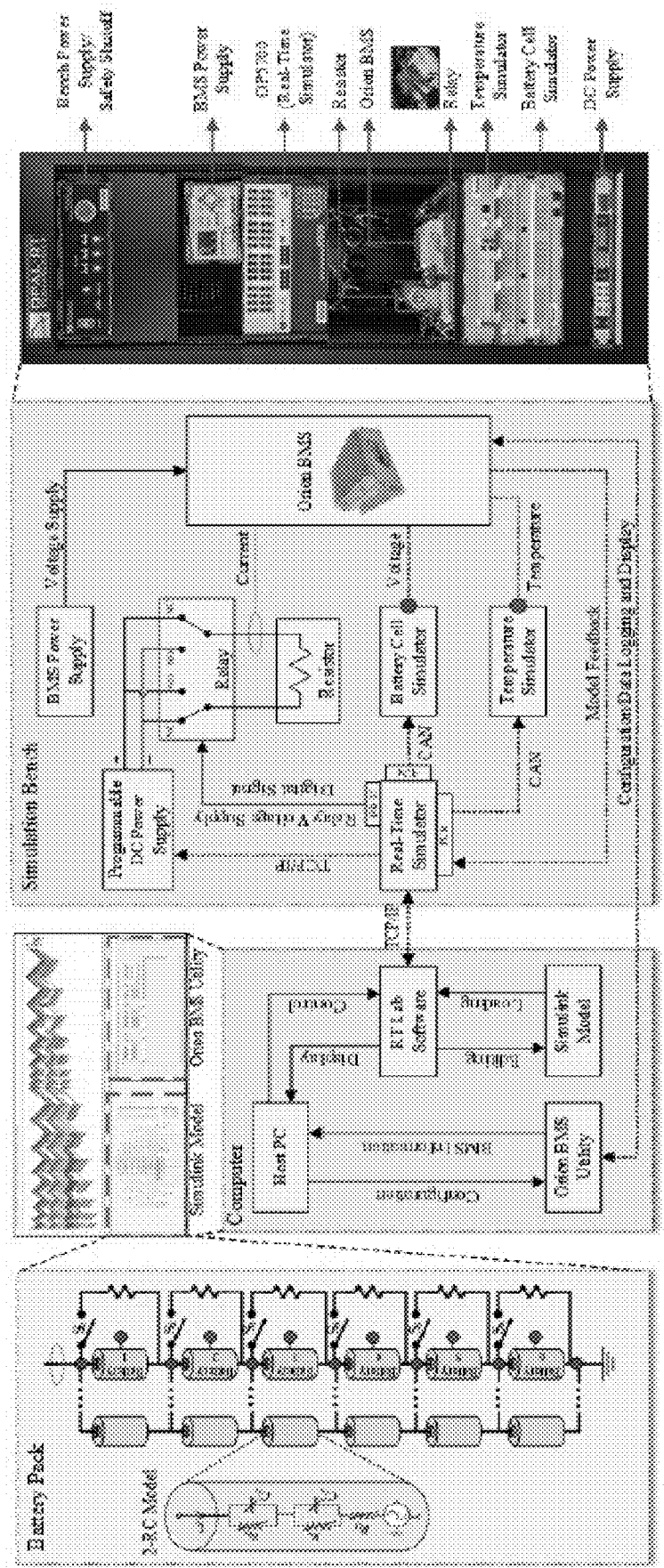
FIG. 1 shows a schematic view of a control-hardware-in-the-loop (CHIL) testbed, according to an embodiment of the subject invention. The setup and operation are shown in the middle and at the right, and the battery model is shown at the left.

Embodiments of the subject invention provide novel and advantageous testbeds for battery management systems (BMSs) and/or batteries (e.g., lithium-ion (Li-ion) batteries), as well as methods of using the same. Embodiments of the subject invention also provide methods for simulating testing on a BMS and/or batteries, as well as methods for increasing the useful life of batteries (e.g., batteries connected to a BMS). A testbed can be a control-hardware-in-the-loop (CHIL) testbed and can include a simulation bench comprising a battery cell simulator, a temperature simulator, and/or a real-time simulator. The simulator bench can further include a programmable power supply (e.g., direct current (DC) power supply), a relay, a resistor, and/or a communication protocol (e.g., between one or more of the programmable power supply, the battery cell simulator, temperature simulator, and/or real-time simulator). The communication protocol can be, for example, Transmission Control Protocol/Internet Protocol (TCP/IP) and/or Controller Area Network (CAN).

The system/testbed can include interaction with software and/or a simulation of a BMS. The software can allow for control of the CHIL (e.g., the simulation) and/or display of the results on a display in operable communication with a processor executing the instructions of the software. The software can be stored on a computer or a (non-transitory) machine-readable medium (e.g., a (non-transitory) computer-readable medium), for example in the form of instructions that when executed by the processor perform certain steps. The software can interact with the simulation bench and/or a battery or battery pack being tested and/or managed by an existing BMS.

A cost-effective way of managing the instabilities in Li-ion batteries can be by deploying a passive balancing BMS capable of dissipating (and/or configured to dissipate) excess charge through resistive components. Active balancing is another way mismatches in individual battery charge capacities can be dealt with; however, active balancing introduces a large number of additional components, increasing control complexity and reducing system reliability, thereby making it often less practical for many battery energy storage applications.

Second-life batteries can help increase the sustainability of new Li battery-based technologies. The possible savings can make second-life alternatives viable, and extension of first-life batteries for second-life use can have positive environmental impacts. Active balancing approaches in BMSs require a higher number of electronic components, thereby increasing the financial constraints of the design. Passive balancing techniques can be implemented using commercial off-the-shelf passive BMSs that support grid storage applications, for example towards achieving network stability. An Orion™ BMS can be used for monitoring and management of second-life batteries for use in real-world photovoltaics and grid storage time-shifting applications. These techniques can be used for electric vehicle (EV) applications, including cycling batteries using constant current constant voltage (CCCV) charging and discharge with a defined cut-off voltage or substantial second life charge-discharge cycling in order to analyze capacity and internal resistance towards the aging performance of second-life batteries. Batteries can be cycled with CCCV charging while using drive profiles for the discharge portion of the cycle. Being able to reuse second-life batteries in EV applications could reduce costs for consumers.

With increased usage, individual batteries within a battery pack can begin to show disparate voltage and state of charge (SOC) profiles which can, as a result, impact the time at which batteries become balanced. Existing BMSs, for example used in EVs and microgrids, typically send out signals suggesting the removal of individual batteries or entire packs to prevent or inhibit thermal runaway scenarios. In order to reuse these batteries, embodiments of the subject invention can analyze an existing (e.g., commercially available or off the shelf) BMS with a constrained cycling approach to assess the voltage balancing, SOC balancing, and thermal performances of such near-to-second life batteries. In Example 1, a scaled-down pack of series-connected batteries in 6s1p and 6s2p topologies were cycled through a combination of US06 drive and constant charge (CC) profiles using an OPAL-RT™ real-time hardware-in-the-loop (HIL) simulator. The results were compared with those obtained from a Matlab/Simulink model to present the error incurred in the simulation environment, and results in Example 1 suggest that the close-to-second life batteries can be reused if operated in a constrained manner and that a scaled-up battery pack topology reduces incurred error.

One of the key issues with declaring a battery as a second-life battery is that the decision is mainly made based on the BMS it has been connected to or operated with.

Existing BMSs, at times, tend to send out signals suggesting the removal of the battery before its actual end-of-life period. In order to address this limitation, embodiments of the subject invention provide a simulation-based BMS whose performance can be compared with that of an existing BMS. The resulting difference in performance can be used to assess the BMS and/or batteries that may be managed thereby. If the near-to-second life batteries are operated in a constrained cycling manner, their performance can further be improved.

In many embodiments, a CHIL testbed can be used to analyze the performance (e.g., performance on a balancing operation) of battery packs and/or battery pack topologies. FIG. 1 shows a schematic view of a CHIL tested setup according to an embodiment of the subject invention. Referring to FIG. 1, a simulation bench (e.g., an OPAL-RT™ bench) equipped with one or more simulators (e.g., a battery cell simulator, a temperature simulator, a programmable single-quadrant direct current (DC) power supply (e.g., in a current control mode), and/or a real-time simulator (e.g., an OP5700 real-time simulator)) can be used in conjunction with a BMS (e.g., an Orion BMS) to form a CHIL testbed. The testbed can allow charging and/or discharging operations by means of an automated relay (e.g., controlled by a model, such as a Matlab/Simulink model), which can switch the current flow from the programmable DC power supply across a resistor in the event of a negative current in the simulation. This, in effect, is read as a charging/discharging current by a sensor of the BMS (e.g., a current sensor, such as the Orion BMS's DHAB S/125 open-loop hall effect current sensor) placed between the relay and the resistor. The relay can be operated using an output port (e.g., a DB-37 digital output port) and a supply voltage (e.g., a 12 Volt (V) DC supply voltage) from the real-time simulator. Communication between other simulation peripherals can be facilitated by two common communication protocols, TCP/IP and CAN. The CAN bus network interfaces using peripheral component interconnect express (PCIe) slots that are also located on the real-time simulator. The BMS (e.g., Orion BMS) can be powered by constant voltage (e.g., 16 V) input power from a separate, additional power supply. The BMS can connect with a battery cell simulator using six voltage probes and six negative temperature coefficient thermistors to read individual battery voltages and temperatures. The precision of temperature measurements obtained from the BMS can have an integer step of, for example, 1° C. The BMS can allow for the configuration of target $\Delta V$, where $\Delta V$ stands for the difference between maximum and minimum voltages of individual batteries and battery pack topology. The CHIL testbed can be used for validation of the BMS. FIG. 1 includes an overview of the communication pathways, feedback loops, supply currents/voltages, and measurement locations for the BMS sensors.

Several Li-ion models for simulation, including the Rint/Simple model, SAFT RC model, linear model, and Thevenin model derivatives, are available online, with the SAFT RC model having the highest SOC estimation accuracy. FIG. 8 shows a table with an extensive list of existing battery models and their dynamicity, which is described by the number of variable functions within them. Variable functions provide information on the set of variables for which the relationship would need to be developed, in addition to inputs, for the model to be operational. A battery model, as a result, develops the relationship between internal parameters and the external application of the battery to identify and simulate their dynamic working characteristics. Internal parameters include, but are not limited to, open circuit voltage (OCV) and internal/ohmic/electrolytic ($R_O$), capacitor ($R_a$), end ($R_e$), terminal ($R_t$), charging ($R_c$), discharging ($R_d$), and polarization/faradic/lumped interfacial reaction ($R_{bx}$) resistances, where $x \in \{Z^+$ranging from 1 to m$\}$ is the number of RC branch pairs. Also, main capacitance ($C_e$) representing the capability of the battery to store charge chemically, secondary capacitance ($C_a$) representing the limiting behavior of battery to deliver current depending on diffusion material and time constants ($\tau$), and concentration/polarization/interfacial ($C_{ix}$) capacitances where $x \in \{Z^+$ ranging from 1 to m$\}$ is the number of RC branches constitutes the remaining internal battery parameters. External application parameters include load current ($I_L$) varying with time (t), and V[X], which indicates voltage applied across element X, where $X \in \{C_a, C_e, C_{ix}\}$, and the output is the battery open terminal voltage (OTV). These models indicate the behavioral approximation of a real battery. Supported battery types and simulation software(s) used are also presented to indicate the extent of scalability of each model.

Figure 2:
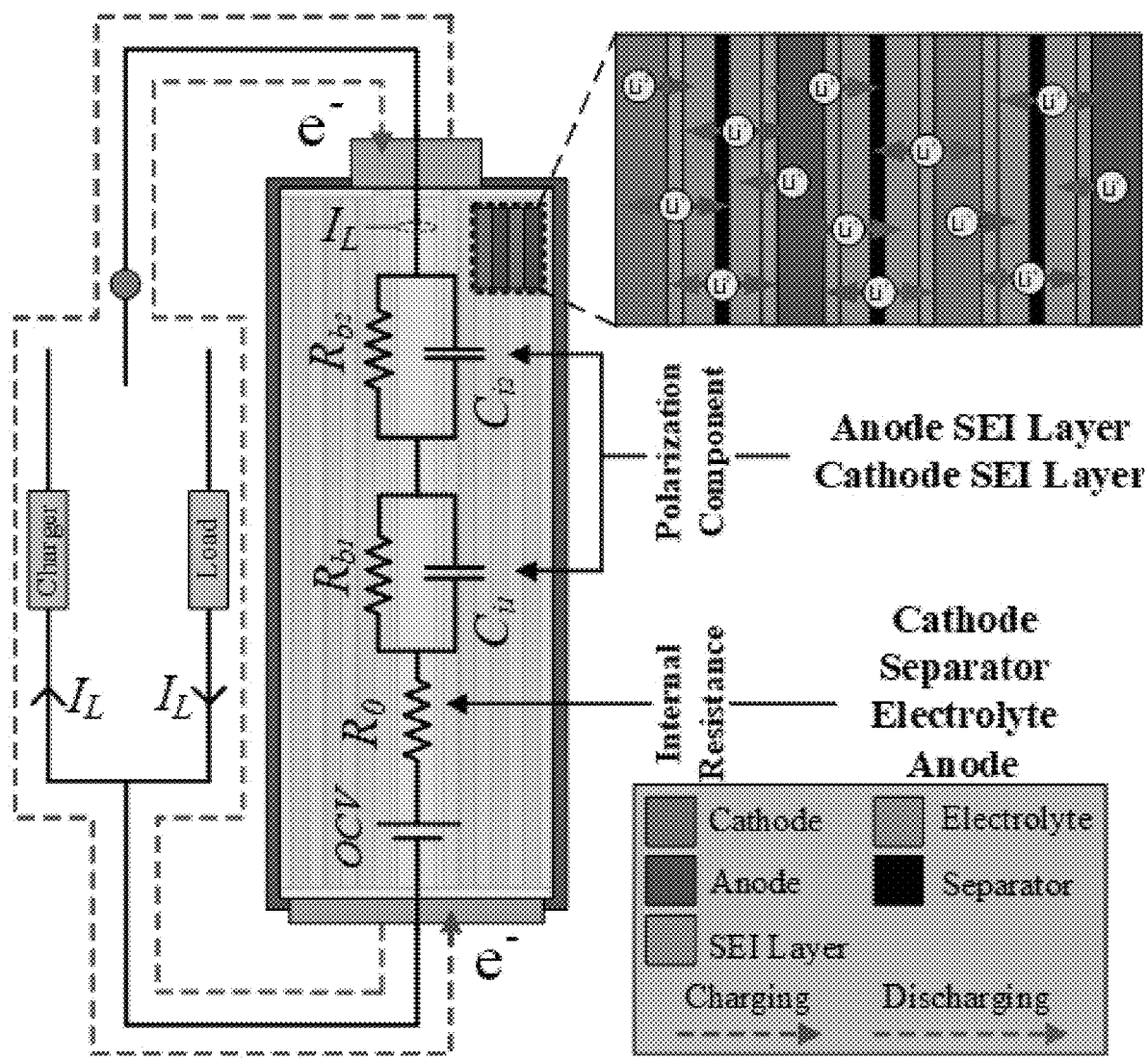
FIG. 2 shows a simplified representation of a two resistor-capacitor (RC) (2-RC) model equivalency.

The m-RC model, which can also be referred to as the table based or dual polarization model, allows modeling of the dynamics of battery components by including all the inputs and components of all the other models listed in FIG. 8. A simplified representation of this model is shown in FIG. 2. The m value is limited to 2 in order to allow simplified modeling of the battery. With this limited m value, the required parameters/variables are $R_0$(SOC), time constants $\tau_1$(SOC) ($=R_{b1}C_{i1}$) and $\tau_2$(SOC) ($=R_{b2}C_{i2}$), OCV(SOC), and $I_L$(t). The resulting OTV varying with t across the modeled battery is represented as shown in Equation (1).

$$OTV(t) = OCV(SOC) - I_L R_0 - V_{ci_1} - V_{ci_2}$$

$$OTV(t) = OCV(SOC) - I_L R_0 - I_L R_{b1}(1 - e^{-t/\tau_1}) - I_L R_{b2}(1 - e^{-t/\tau_2}) \quad (1)$$

Hybrid pulse power characterization and electrochemical impedance spectroscopy test results from a 3.6 V nominal voltage, 2.75 Ampere-hour (Ah) rated capacity NCR18650PF battery can be used to build this model (see also Kollmeyer, Panasonic 18650pf li-ion battery data, 2018. Available from: data.mendeley.com/datasets/wykht8y7tg/1; Khalid et al., Simulation-based analysis of equalization algorithms on active balancing battery topologies for electric vehicles, in Advances in Intelligent Systems and Computing, Springer, vol. 1069, 2019, pp. 708-728; both of which are hereby incorporated by reference herein in their entireties). This modeling technique is similar to the Verband der Automobilindustrie current step-based method for modeling the battery (see also Madani et al., Review of parameter determination for thermal modeling of Li-ion batteries, Batteries, vol. 4, no. 2, p. 20, 2018; which is hereby incorporated by reference herein in its entirety). The beginning values of SOC in the modeled battery pack range from 9.6% to 85.9% to replicate close-to-second life batteries. The resulting modeled battery pack contains battery stacks consisting of 6 series-connected batteries. For the first simulation, a single stack (6s1p) is used, while for the second simulation, two battery stacks are connected in an interleaved manner (for 6s2p topology) (see also Sarwat et al., Battery module performance analysis under varying interconnection topology for electric vehicles, in 2019 IEEE Transportation Electrification Conference (ITEC-India), IEEE, 2019, pp. 1-5; which is hereby incorporated by reference herein in its entirety).

The capacity rating (dependent on battery temperature) of each battery can be obtained from the battery's datasheet.

Each series-connected battery can be equipped with balancing circuitry capable of mimicking the BMS's (e.g., the Orion BMS's) capabilities. The balancing current (for both 6s1p and 6s2p topologies) can be set to, for example, 200 milliAmperes (mA) (e.g., as determined from the Orion BMS operation manual). The software module (e.g., the OPAL-RT's RT Lab software) can provide an interface to model using Matlab/Simulink and control the real-time simulators using TCP/IP protocol. During simulation, the BMS can return balance command feedback to the battery pack model to emulate its individual battery balancing capability. The balancing operation can be realized by monitoring battery charging/discharging current and voltage parameters. The difference in voltage between each individual battery ($V_{bn}$) and the lowest voltage battery ($V_{bmin}$) can be compared against the configured target $\Delta V$. Here, n is the number of series-connected batteries. If the difference is greater than target $\Delta V$, the switch corresponding to that battery's number, $S_n$, can close, thereby completing the balancing circuit and allowing for the dissipation of excess charge. After a balancing period defined by the BMS's algorithm (e.g., approximately 100 seconds), switch $S_n$ can reopen, and a monitoring check delay (e.g., approximately 10 seconds) can be performed before determining again if batteries need to continue to be balanced.

$$SOC = SOC_{t_x} + \frac{\int_{t_x}^{t_y} \{aI_c + (a-1)I_d\}dt}{C_p} \times 100\%, \quad (2)$$

$$\text{where, } a = \begin{cases} 0, \text{ while discharging} \\ 1, \text{ while charging} \end{cases}$$

Figure 3:
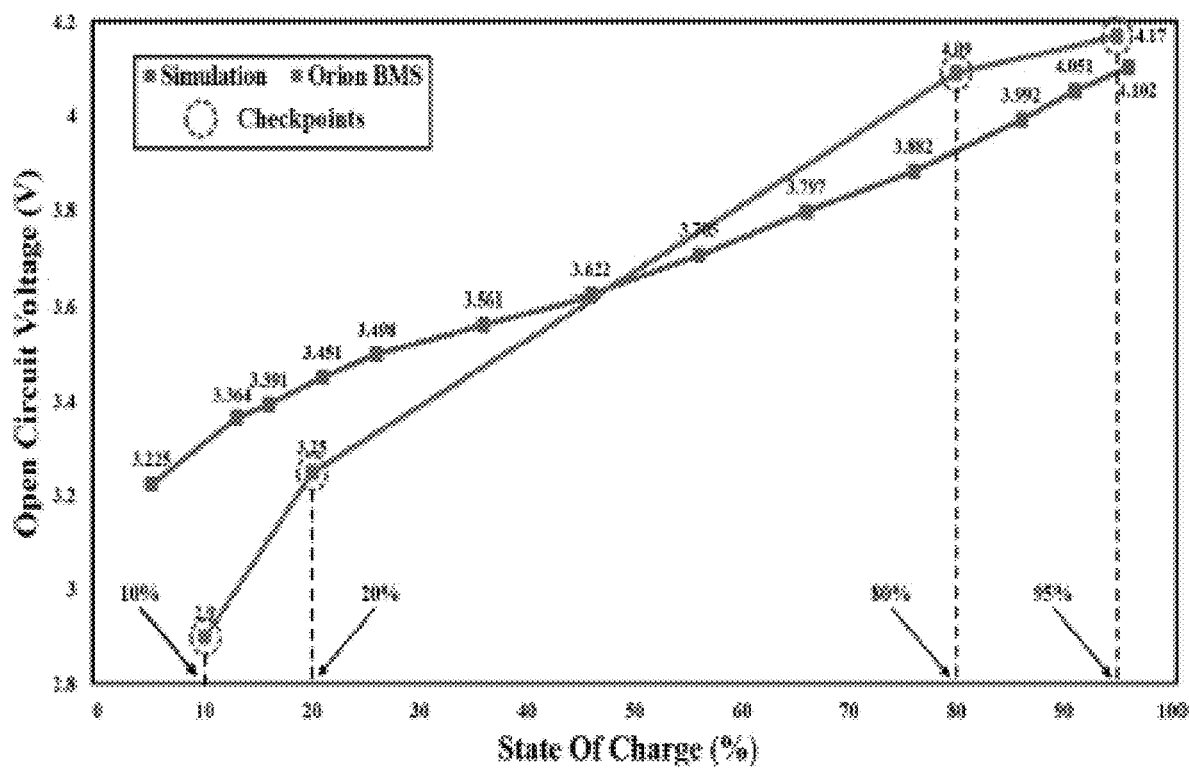
FIG. 3 shows a plot of state of charge (SOC) in percentage (%) versus open circuit voltage (OCV) in Volts (V) for a simulation and an existing battery management system (BMS). The curve with the higher value at SOC=10% is for the simulation, and the other curve is for the existing BMS.

Towards SOC calculation, both the simulation and the BMS can implement a standard coulomb counting method by using charging/discharging current ($I_c/I_d$) and capacity ($C_p$), acquired from monitoring, to determine a SOC increase or decrease, as shown in Equation (2). In Equation (2), $SOC_{t_x}$ is the SOC measured at initial time instant $t_x$ and $t_y=t_x+\Delta t$ is the elapsed time, where $\Delta t$ is the SOC measurement duration between instances $t_x$ and $t_y$. In addition to coulomb counting, the BMS can implement a secondary SOC adjustment (correction) algorithm where the lowest ($OCV_{min}$) and highest ($OCV_{max}$) individual battery OCVs are used to help determine actual SOC values of the battery pack based on a configurable SOC versus. OCV plot. For example, by selecting the NCR18650PF battery within the BMS's utility (e.g., within the Orion BMS's utility), nominal capacity and SOC versus OCV look-up table checkpoints are set by default. Values for SOC versus OCV for both the simulation and Orion BMS's default settings are superimposed in FIG. 3, where checkpoint values for SOC adjustment are also marked.

Figure 5:
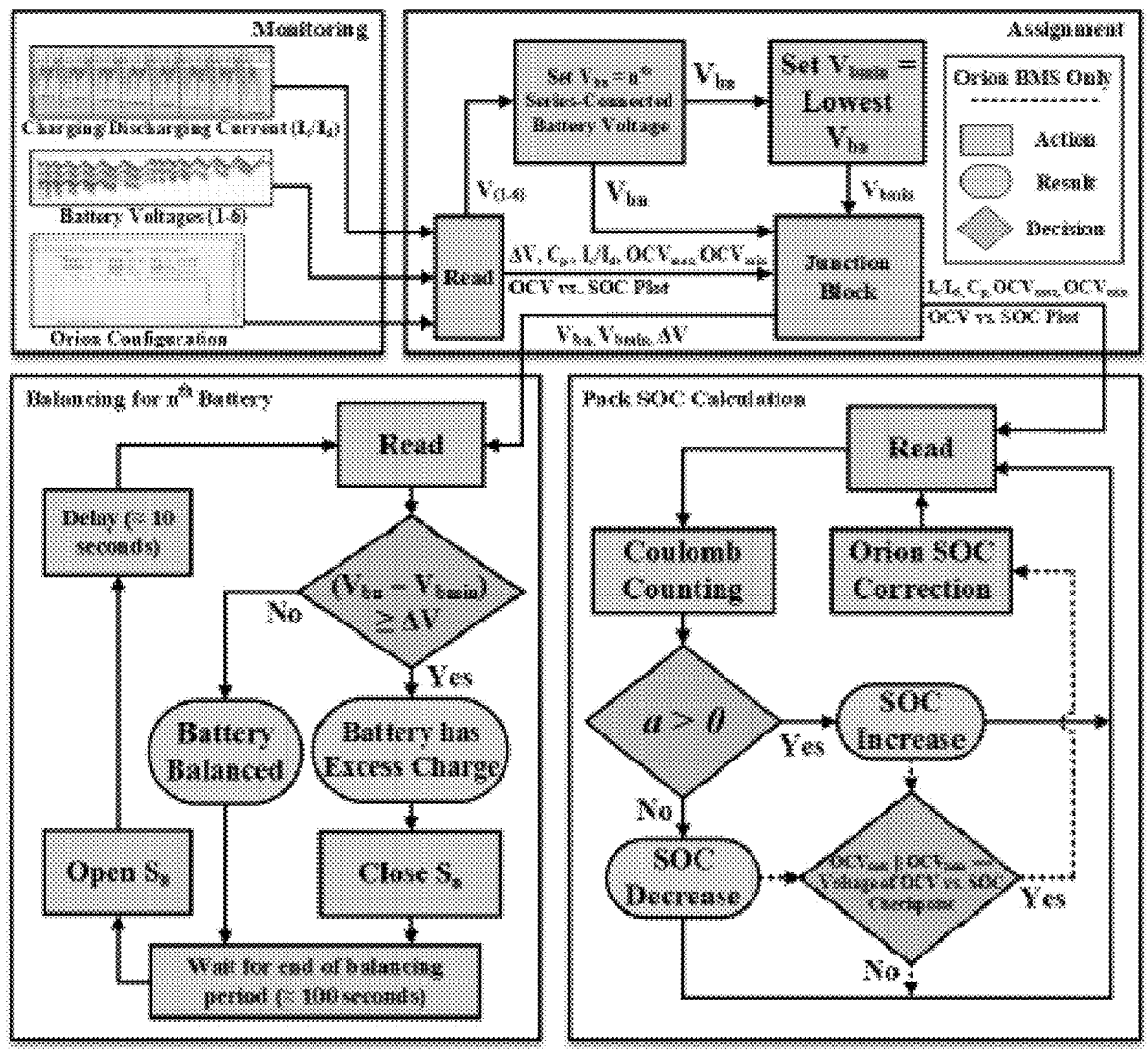
FIG. 5 shows a simulation BMS and existing BMS operational flowchart, according to an embodiment of the subject invention.

The battery pack model topologies, circuitry, and individual battery components can be seen in FIG. 1, whereas the operational flowchart for battery balancing and SOC calculation for both the simulation and the BMS can be seen in FIG. 5.

Embodiments of the subject invention provide systems and methods for testing BMS's, contributing towards the emerging field of second-life batteries. The operational differences of a commercial passive balancing Orion BMS were compared for two different battery pack topologies having second-life batteries (see Example 1). An OPAL-RT™ real-time HIL testbed was used to feed the BMS's sensors voltage, current, and temperature values from a Matlab/Simulink model, and the results from the simulation and the Orion BMS were compared. The disparity in SOC versus OCV checkpoints, seen in FIG. 3, introduces SOC identification error. Thus, the default SOC adjustment algorithm's checkpoint values in commercial BMSs should be analyzed and updated for every battery chemistry based on their applicable SOC-OCV test results. Also, based on the results of Example 1, any BMS can benefit from constrained cycling approaches depending on the state of individual battery parameters. In addition, increasing temperature measurement precision as well as taking into account the change in capacity resulting from thermal variations can improve SOC calculations of a BMS. Moreover, lower target $\Delta V$ values can be advantageous if implemented for scaled-up battery topology.

Embodiments can be used to incorporate a sequence within commercially available BMSs that can possibly prevent or inhibit them from declaring a near-to-second life battery as a second-life battery. The comparison of mean squared error in performances of the simulation and the Orion BMS suggest an improvement of 0.18% in the case of 6s1p topology and 3.61% in the case of 6s2p topology (see Example 1). This improvement in error in the case of scaled-up 2s2p topology means that the configuration can also be changed to improve the performance of a BMS.

Embodiments provide: detailed component-wise comparisons of existing battery models; details on configuration and operation of a CHIL testbed for an existing (e.g., a commercially-available) BMS; comparisons of simulation-based BMS results and existing BMS results to assess the resulting error introduced by operating close-to-second life batteries (e.g., in a US06 drive profile).

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of embodiments of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

The transitional term "comprising," "comprises," or "comprise" is inclusive or open-ended and does not exclude additional, unrecited elements or method steps. By contrast, the transitional phrase "consisting of" excludes any element, step, or ingredient not specified in the claim. The phrases "consisting" or "consists essentially of" indicate that the claim encompasses embodiments containing the specified materials or steps and those that do not materially affect the basic and novel characteristic(s) of the claim. Use of the term "comprising" contemplates other embodiments that "consist" or "consisting essentially of" the recited component(s).

When ranges are used herein, such as for dose ranges, combinations and subcombinations of ranges (e.g., subranges within the disclosed range), specific embodiments therein are intended to be explicitly included. When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to embodiments of the invention.

Example 1

Figure 4:
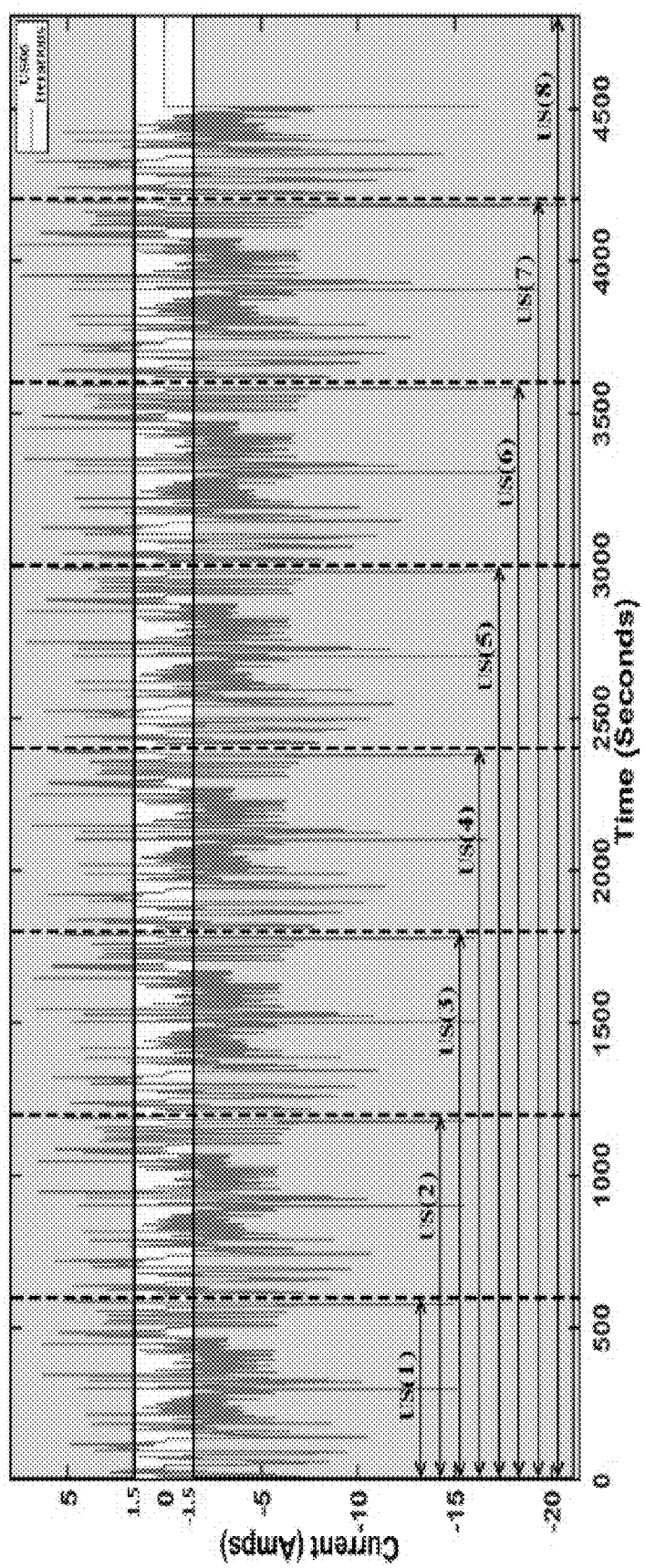
FIG. 4 shows a complete US06 current profile containing iterations, out of which a +/−1.5 Ampere (A) region is used in the sequence (from Kollmeyer, Panasonic 18650pf li-ion battery data, 2018, available from: data.mendeley.com/datasets/wykht8y7tg/1).

Assessments were conducted in order to analyze the second life battery balancing capabilities of an Orion BMS and included subjecting the BMS to a rigorous charge-drive cycle. A US06 current profile, shown in FIG. 4, where each {US(N+1)-US(N)} portion with a duration of approximately 10 minutes, was selected for the drive portions of the sequence, and a constant charge (CC) of 1.375 A and 0.6875 A (through each individual battery) for 6s1p and 6s2p topologies, respectively, was selected for the charge portions of the sequence based on the datasheet. Battery sequencing was realized by alternating drive and charge portions where drive time and charge time were incremented by one US06 iteration and 7.5 minutes, respectively, until a cumulative maximum drive duration of 80 minutes and a cumulative maximum charge duration of 60 minutes had been achieved. In order to properly sequence the 6s1p topology, the US06 (1) drive portion was omitted. For the 6s2p topology, the US06(1) drive portion was placed at the end of the sequence in order to keep continuity, and an additional alternating sequence was also used because of the increased capacity. Although the US06 current profile has maximum charge (regenerative) and discharge currents of 7.57 A and −20.82 A, respectively, the drive current was limited to ±1.5 A within the simulation model. This limit was obtained from the datasheet of the programmable DC power supply. A ΔV target of 50 milliVolts (mV) was set in the Orion BMS utility as the voltage threshold at which balancing was triggered for any individual battery outside of this limit in comparison to the lowest series-connected individual battery voltage. A breakdown of the battery pack topologies, charge-drive sequences, ΔV targets, and current limits used during each test is shown in the table in FIG. 9.

The performance of battery pack topologies on a balancing operation was also assessed, using the OPAL-RT™ bench equipped with a battery cell simulator, a temperature simulator, a programmable single-quadrant DC power supply (in a current control mode), and an OP5700 real-time simulator used in conjunction with the Orion BMS to form the CHIL testbed. This testbed allowed charging and discharging operations by means of an automated relay controlled by the Matlab/Simulink model, which switches the current flow from the programmable DC power supply across the resistor, in the event of a negative current in the simulation. This in effect is read as a charging/discharging current by the Orion BMS's DHAB S/125 open-loop hall effect current sensor, which is placed between the relay and the resistor. The relay was operated using a DB-37 digital output port and a 12 V DC supply voltage from the real-time simulator. Communication between other simulation peripherals was facilitated by two common communication protocols, TCP/IP and CAN. The CAN bus network interfaced using PCIe slots located on the real-time simulator. The Orion BMS was powered by a constant voltage 16 V input power from a separate, additional power supply. For reading individual battery voltages and temperatures, the Orion BMS connects with a battery cell simulator using six voltage probes and six negative temperature coefficient thermistors. The precision of temperature measurements obtained from the Orion BMS has an integer step of 1° C. The Orion BMS allows for the configuration of the target ΔV, where ΔV stands for the difference between maximum and minimum voltages of individual batteries, and battery pack topology. A similar BMS configuration using the 2-RC battery model was set up in simulation but used a constrained cycling sequence that allows the battery parameters to remain within the safe operating ranges. When the same configuration was fed into the Orion BMS, the voltage and SOC cycles appeared to touch extreme magnitudes.

Figure 6A:
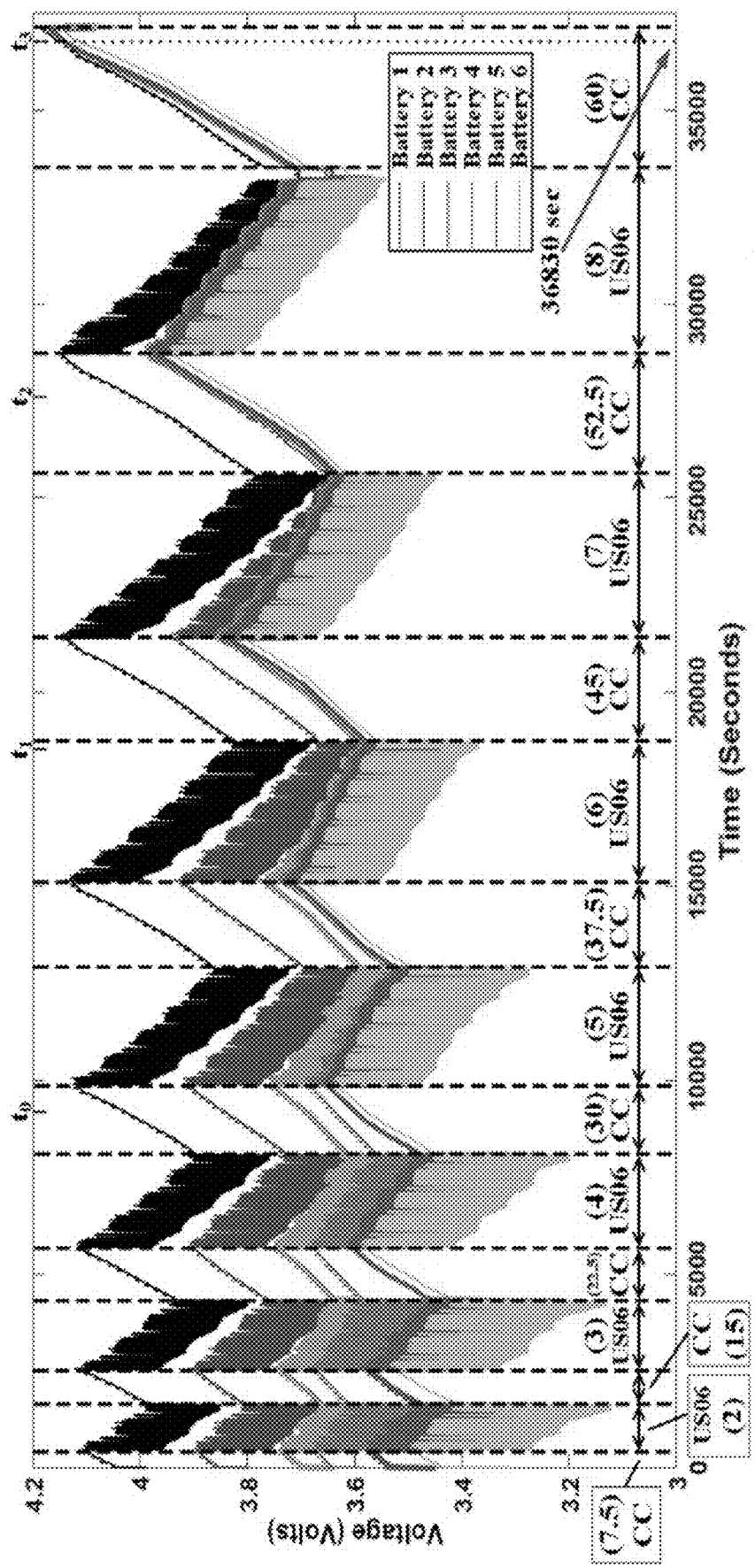
FIG. 6(a) shows a plot of voltage (in Volts (V)) versus time (in seconds) showing voltage equalization during a simulation of a BMS for 6s1p topology. The curve with the highest voltage value at 10,000 seconds is for battery 1, with the curve with the next-highest voltage value at 10,000 seconds being for battery 2, and so on down to the curve with the lowest voltage value at 10,000 seconds being for battery 6.
Figure 6B:
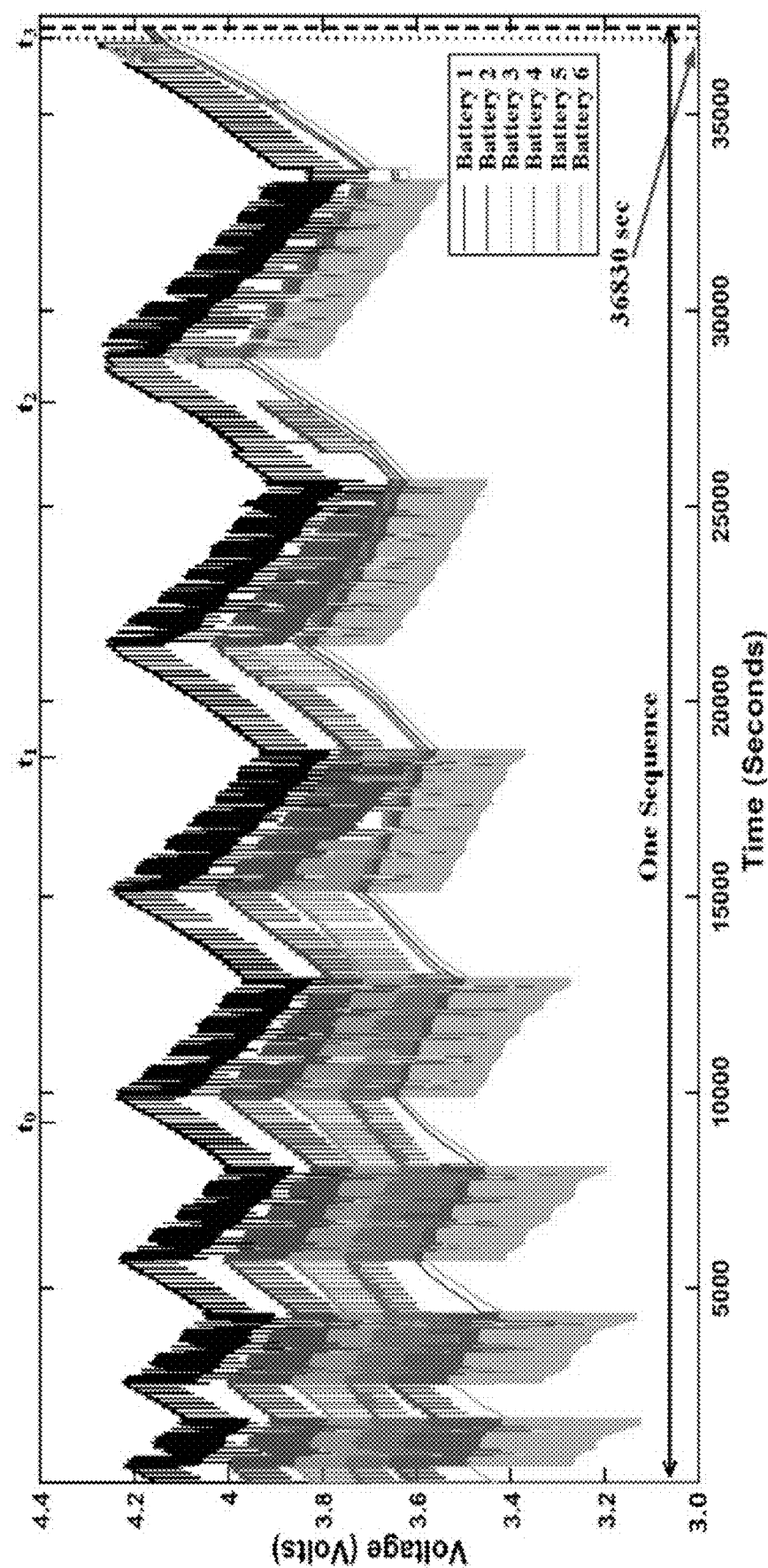
FIG. 6(b) shows a plot of voltage (in V) versus time (in seconds) showing voltage equalization during operation of an existing BMS for 6s1p topology. The curve with the highest voltage value at 10,000 seconds is for battery 1, with the curve with the next-highest voltage value at 10,000 seconds being for battery 2, and so on down to the curve with the lowest voltage value at 10,000 seconds being for battery 6.
Figure 6C:
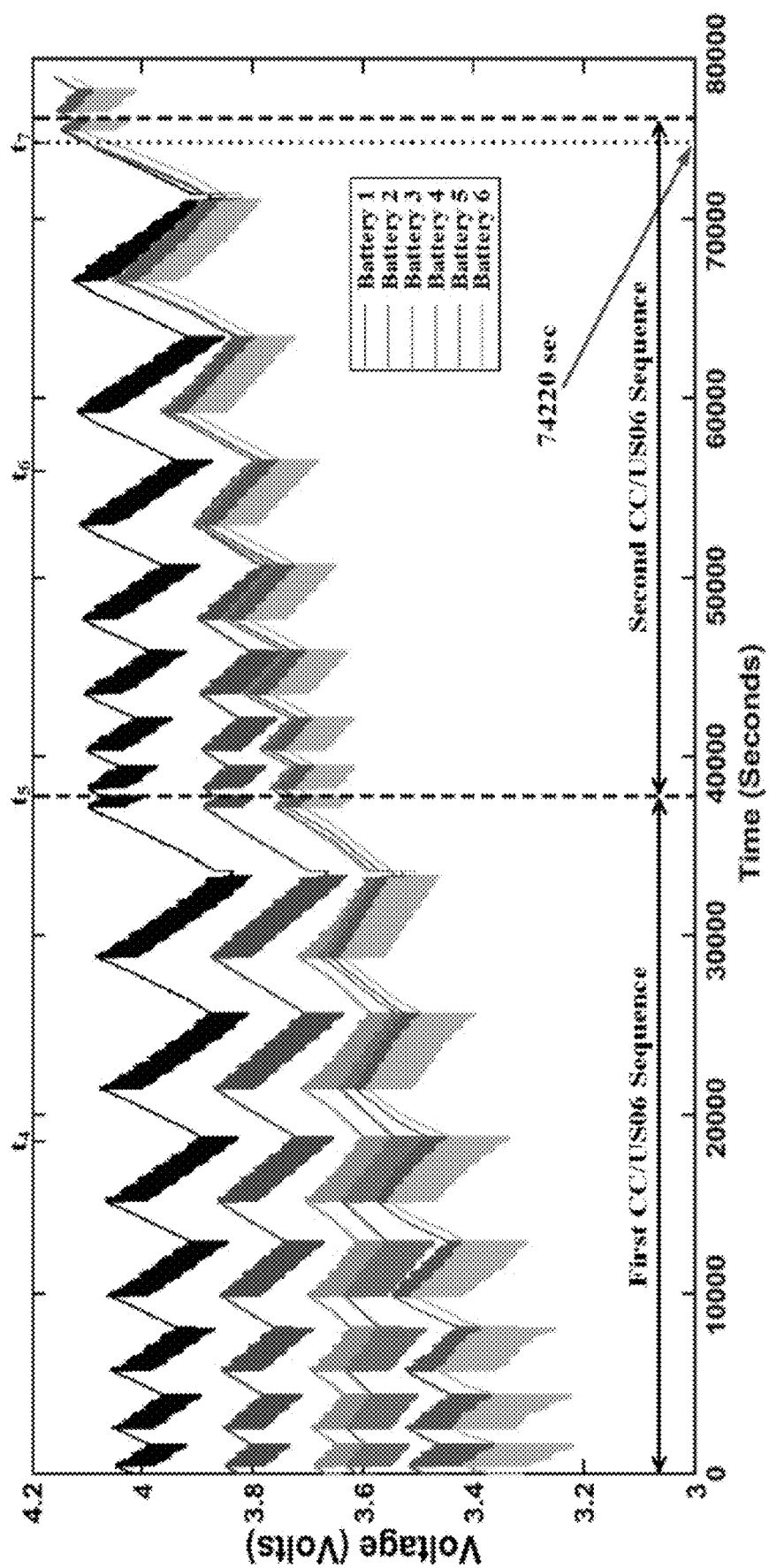
FIG. 6(c) shows a plot of voltage (in V) versus time (in seconds) showing voltage equalization during a simulation of a BMS for 6s2p topology. The curve with the highest voltage value at 10,000 seconds is for battery 1, with the curve with the next-highest voltage value at 10,000 seconds being for battery 2, and so on down to the curve with the lowest voltage value at 10,000 seconds being for battery 6.
Figure 6D:
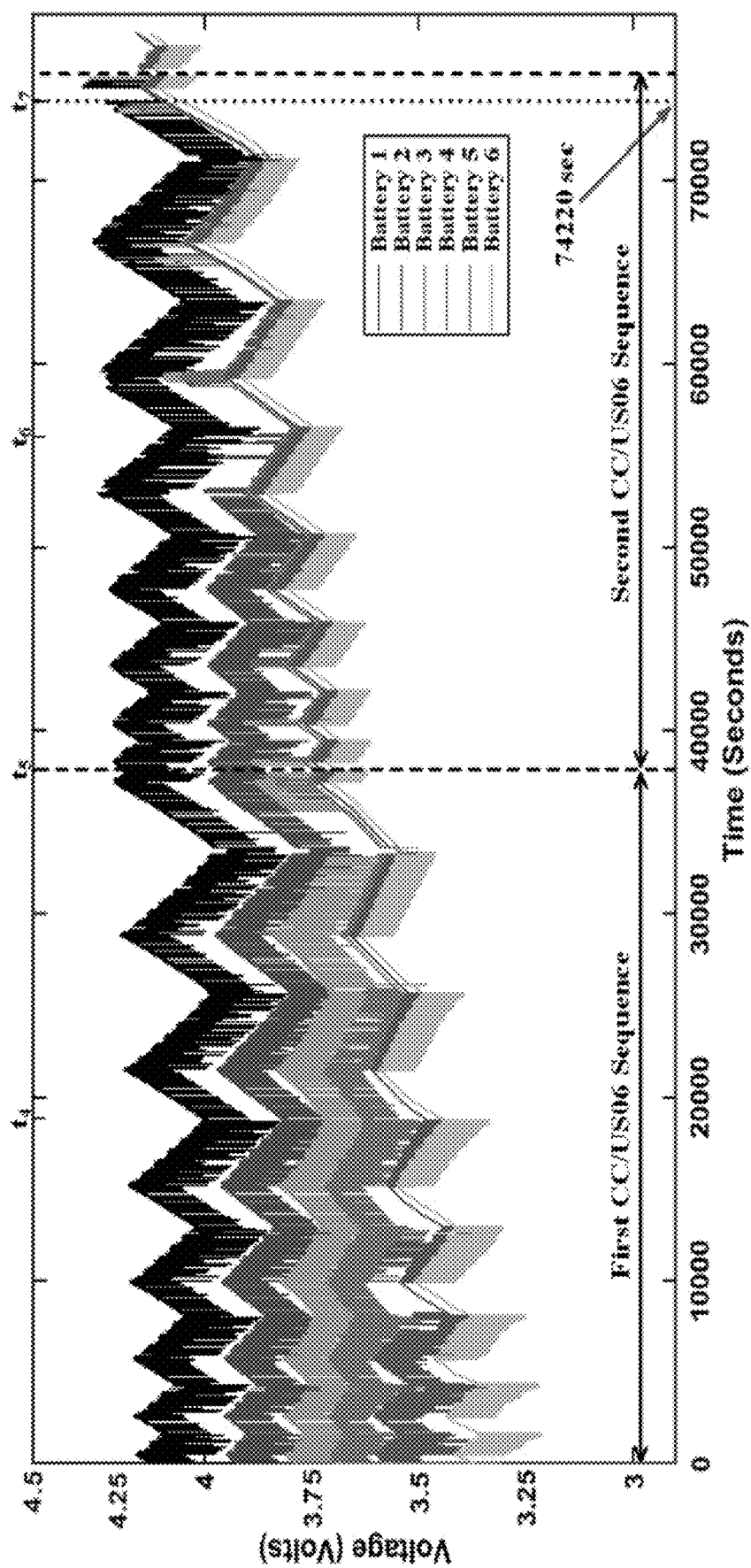
FIG. 6(d) shows a plot of voltage (in V) versus time (in seconds) showing voltage equalization during operation of an existing BMS for 6s2p topology. The curve with the highest voltage value at 10,000 seconds is for battery 1, with the curve with the next-highest voltage value at 10,000 seconds being for battery 2, and so on down to the curve with the lowest voltage value at 10,000 seconds being for battery 6.
Figure 6E:
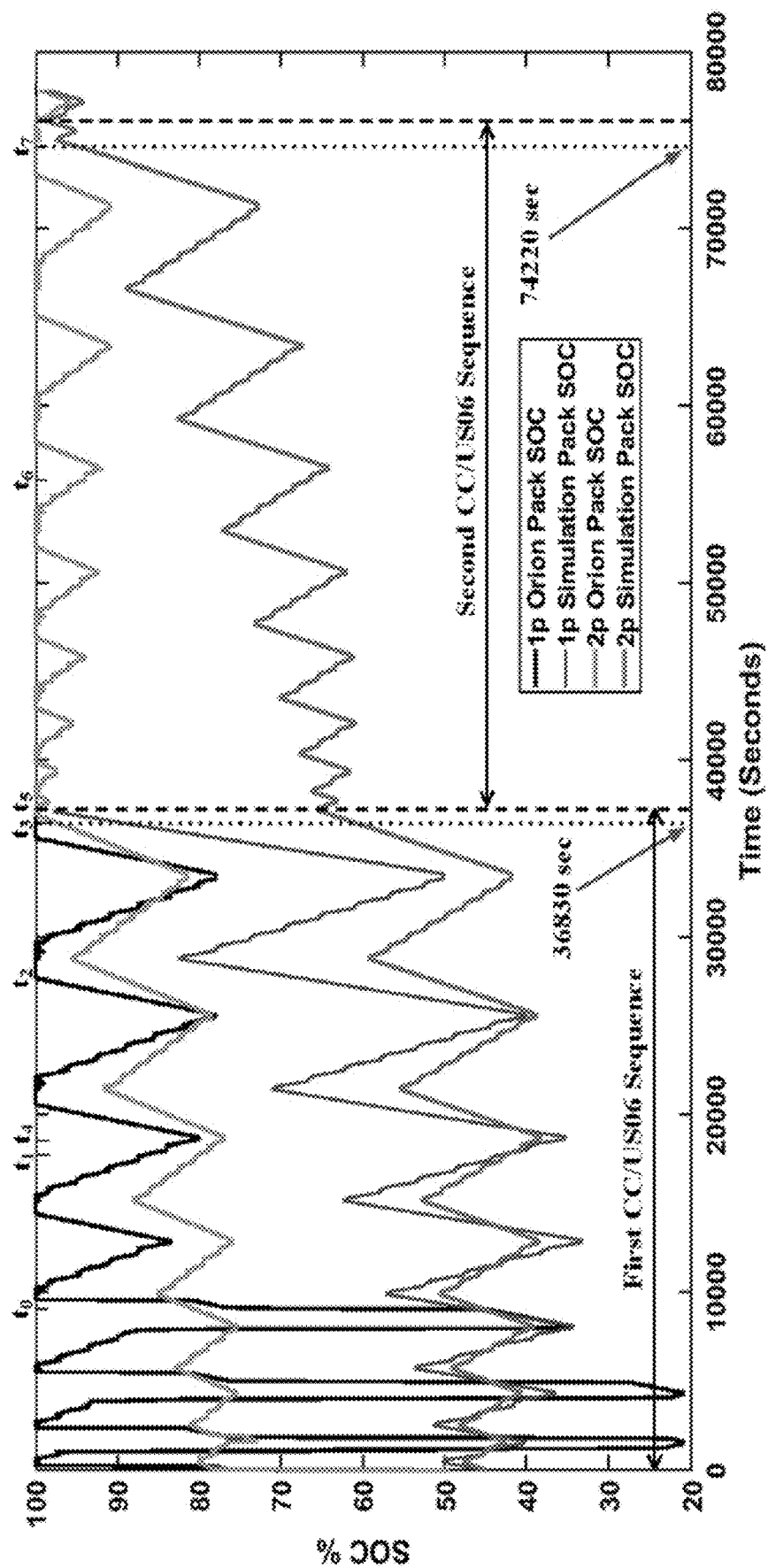
FIG. 6(e) shows a plot of SOC (in %) versus time (in seconds) during a simulation of a BMS and during operation of an existing BMS, both for 6s1p topology and for 6s2p topology. The curve with the highest value at 10,000 seconds is for the existing BMS for 6s1p topology; the curve with the second-highest value at 10,000 seconds is for the existing BMS for 6s2p topology; the curve with the third-highest value at 10,000 seconds is for the simulation for 6s1p topology; and the curve with the lowest value at 10,000 seconds is for the simulation for 6s2p topology.
Figure 6F:
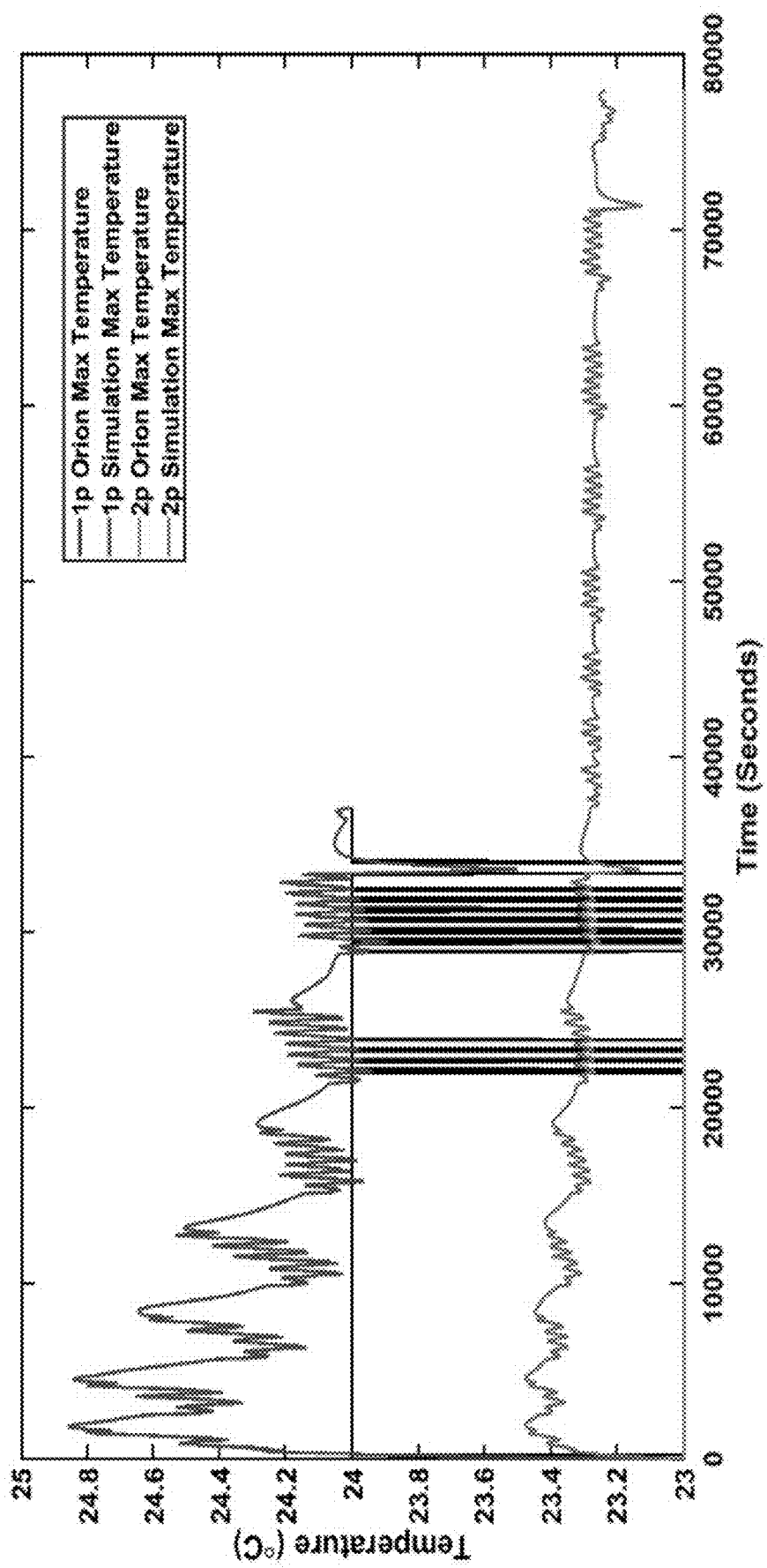
FIG. 6(f) shows a plot of temperature (in degrees Celsius (° C.)) versus time (in seconds) during a simulation of a BMS and during operation of an existing BMS, both for 6s1p topology and for 6s2p topology. The curve with the highest value at 10,000 seconds is for the simulation for 6s1p topology; the curve with the second-highest value at 10,000 seconds is for the existing BMS for 6s1p topology; the curve with the third-highest value at 10,000 seconds is for the simulation for 6s2p topology; and the curve with the lowest value at 10,000 seconds is for the existing BMS for 6s2p topology.

The alternating charge-drive sequence used for both battery pack topologies is represented in FIG. 6(a) and is subsequently shown in its entirety in FIGS. 6(a)-6(f.) Individual battery voltages of the first topology, for both the simulation and the Orion BMS, can be seen converging in FIGS. 6(a) and 6(b), respectively. Similarly, individual battery voltages of the second topology, for both the simulation and the Orion BMS, are shown in FIGS. 6(c) and 6(d), respectively. Balancing time for the 6s1p topology is shown in FIGS. 6(a), 6(b), and 6(e) as a dotted line at 36,830 seconds. Similarly for the 6s2p topology, a balancing time of 74,220 seconds is shown in FIGS. 6(c), 6(d), and 6(e). Total battery pack SOC from both the simulation and the Orion BMS for both 6s1p and 6s2p topologies can be seen together in FIG. 6(e). Maximum measured battery pack temperatures from both the simulation and the Orion BMS for both topologies can be seen in FIG. 6(f). Temperatures for the 6s2p topology were considerably lower considering that the current flow through each individual battery was half (0.6875 A) compared to the 6s1p topology (1.375 A). Also, the maximum temperatures stabilized with a decrease in SOC imbalances for both topologies.

Figure 7:
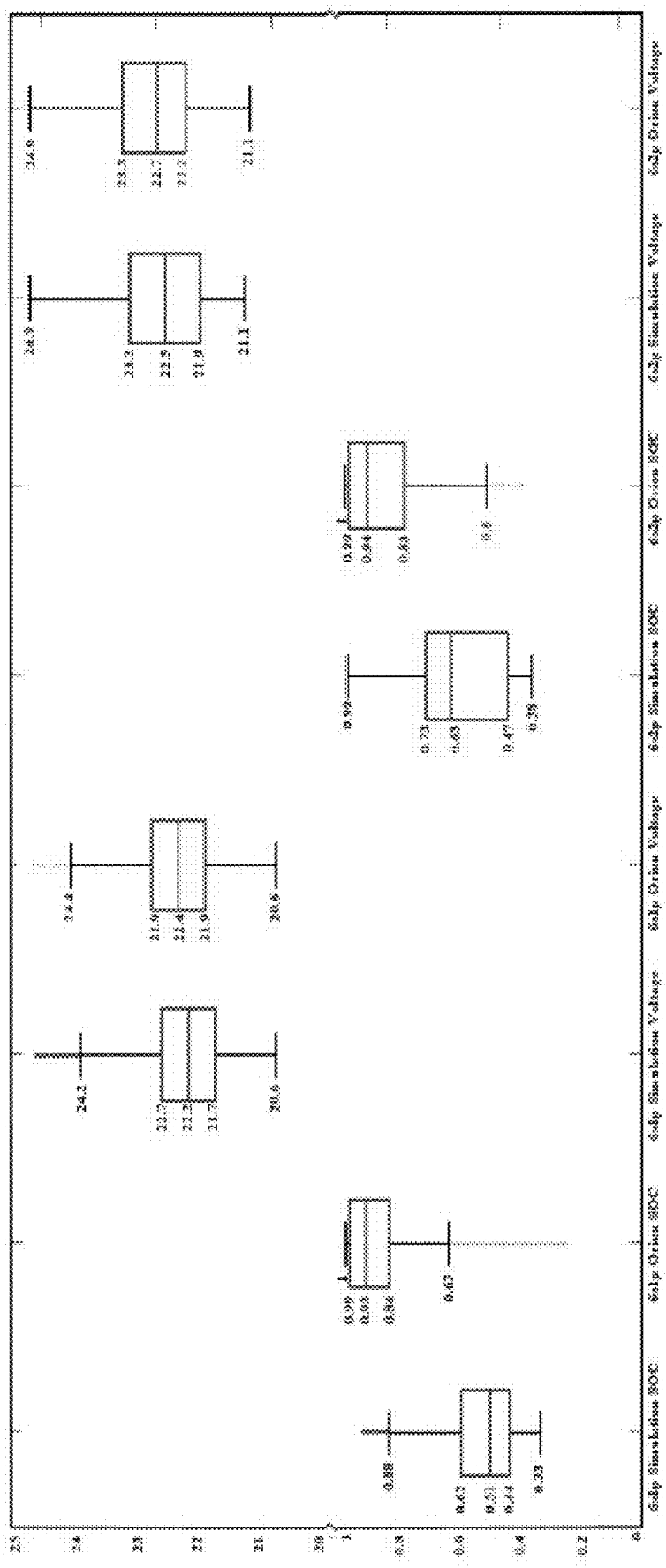
FIG. 7 shows box plots of simulation BMS and existing BMS results for 6s1p and 6s2p topologies.

As shown in FIG. 7 for both topologies, the interquartile range decreased in comparison with the simulation, meaning that data from the Orion BMS is less dispersed. While the Orion BMS's voltage distribution presents close to a normal distribution, its SOC distribution is skewed right resulting from the SOC frequently reaching the maximum value, as evident in FIG. 6(e). In addition, a significant reduction in the density and quantity of outliers from 6s1p to 6s2p suggests that the unusual or error-introducing data points reduce as the topology gets scaled up.

Throughout both 6s1p and 6s2p cycling, it can be seen that for the Orion BMS, SOC values often reach 100% due to maximum individual battery voltage reaching 4.2 V, which is considered "fully charged" within the Orion BMS's utility. Minimum individual battery voltages also affect the SOC calculations when the SOC correction algorithms SOC versus OCV checkpoints are reached. Due to the large differences in individual battery voltages within the modeled battery pack, a back and forth swing in SOC (in Orion BMS) from t=0 to $t_0$ can be seen in FIG. 6($e$). Another observation that can be seen in FIG. 6($e$) is the SOC dip experienced by the simulation (for both topologies) within the first sequence, resulting in mismatched pack SOC minimums between the simulation and the Orion BMS. This can be attributed to the simulation taking into account the loss of individual battery charge due to each battery's dissipative balancing current, whereas for the Orion BMS, because these currents do not pass through the current hall sensor, they are not registered as a loss in SOC when using the coulomb counting method. Further, the mean squared error (MSE) between the results obtained from the simulation and those obtained from the Orion BMS is calculated using Equation (3), where $Y_{Simulated} \in$ simulated BMS's pack SOC or pack voltage, and $Y_{Orion} \in$ Orion BMS's pack SOC or pack voltage, for both topologies. The number of data points, k, used for this calculation were 36,830 and 74,220 for 6s1p and 6s2p topologies, respectively.

$$MSE \% = \frac{100\%}{k} \sum_{j=1}^{k} (Y_{Simulated}(j) - Y_{Orion}(j))^2 \quad (3)$$

The results show that the MSE drops from 6.42% to 6.24% for voltage and from 13.7% to 10.09% for SOC when the topology is scaled-up from 6s1p to 6s2p.

As the simulated BMS voltages present a gradual increase up to the upper voltage threshold of 4.2 V (as seen in FIGS. 6($b$) and 6($d$)), the constrained operation thus keeps the battery within safe operation thresholds. Hence, the Orion BMS would benefit from constrained cycling approaches depending on the state of individual battery parameters.

The entire sequence SOC minimums and maximums in the Orion BMS frequently reached extremes, seen in FIG. 6($e$), and may signal early battery replacement. In addition, these extremes also appear to be influenced by balancing currents because of the visible dips in the first sequence. These dips could affect mid-range SOC calculations, which as a result might not trigger SOC adjustment algorithms. Hence, this further strengthens the requirement of operating commercial BMSs in a constrained cycling manner.

Because the Orion BMS only measures temperatures in increments of 1° C., the results in FIG. 6($f$) do not present the complete temperature dynamics as opposed to the simulation BMS. Hence, increasing temperature measurement precision as well as taking into account the change in capacity resulting from thermal variations could improve the SOC calculations of the Orion BMS.

The interleaved battery topology (6s2p) significantly decreased overshooting voltages at timestamps $t_3$ and $t_7$, as seen in FIG. 6($e$) and the table in FIG. 10($a$). This suggests that lower target $\Delta V$ values can be implemented for scaled-up battery topology. In addition, this scaled-up battery topology reduces the incurred error as evident from the MSE reduction of 0.18% in the case of 6s1p topology and 3.61% in the case of 6s2p topology and diminishing outliers seen in FIG. 7.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A system for testing a battery management system (BMS) having batteries connected thereto, the system comprising:
    a simulation bench configured to connect to the BMS having batteries connected thereto;
    a processor; and
    a machine-readable medium in operable communication with the processor and having instructions stored thereon that, when executed by the processor, perform steps to generate state of charge (SOC) results of a simulated BMS, receive SOC data from the BMS having batteries connected thereto, compare SOC results of the stimulated BMS to the SOC data collected from the BMS having batteries connected thereto, and determine an error in the SOC data of the BMS having batteries connected thereto, thereby testing the BMS having batteries connected thereto,
    the simulation bench comprising:
        a battery cell simulator configured to connect to the BMS having batteries connected thereto;
        a temperature simulator configured to connect to the BMS having batteries connected thereto;
        a real-time simulator connected to the battery cell simulator and the temperature simulator;
        a power supply connected to the real-time simulator;
        a relay connected to the power supply of the simulation bench,
        a resistor connected to the relay; and
        a current sensor disposed between and connected to the relay and the resistor,
    the system being a control-hardware-in-the-loop (CHIL) system.

2. The system according to claim 1, the power supply of the simulation bench being a programmable power supply.

3. The system according to claim 2, the power supply of the simulation bench being a programmable direct current (DC) power supply.

4. The system according to claim 1, the real-time simulator being connected to the relay and providing a relay voltage supply digital signal thereto.

5. The system according to claim 1, the battery cell simulator being connected to the real-time simulator via a Controller Area Network (CAN).

6. The system according to claim 1, the temperature simulator being connected to the real-time simulator via a CAN.

7. The system according to claim 1, the real-time simulator being connected to the power supply of the simulation bench via Transmission Control Protocol/Internet Protocol (TCP/IP).

8. The system according to claim 1, the real-time simulator being connected to the machine-readable medium via TCP/IP.

9. A method for testing a battery management system (BMS) having batteries connected thereto, the method comprising:
proving a system comprising a simulation bench configured to connect to the BMS having batteries connected thereto, a processor, and a machine-readable medium in operable communication with the processor and having instructions stored thereon that, when executed by the processor, perform steps to generate state of charge (SOC) results of a simulated BMS;
connecting the BMS having batteries connected thereto to the simulation bench;
generating the SOC results of the simulated BMS;
collecting SOC data from the BMS having batteries connected thereto; and
comparing the SOC results of the simulated BMS to the SOC data collected from the BMS having batteries connected thereto to determine an error in the SOC data of the BMC having batteries connected thereto, thereby testing the BMS having batteries connected thereto,
the simulation bench comprising:
a battery cell simulator configured to connect to the BMS having batteries connected thereto;
a temperature simulator configured to connect to the BMS having batteries connected thereto;
a real-time simulator connected to the battery cell simulator and the temperature simulator;
a power supply connected to the real-time simulator;
a relay connected to the power supply of the simulation bench;
a resistor connected to the relay; and
a current sensor disposed between and connected to the relay and the resistor.

10. The method according to claim 9, the power supply of the simulation bench being a programmable direct current (DC) power supply.

11. The method according to claim 9,
the real-time simulator being connected to the relay and providing a relay voltage supply digital signal thereto.

12. The method according to claim 9, the battery cell simulator being connected to the real-time simulator via a Controller Area Network (CAN).

13. The method according to claim 9, the temperature simulator being connected to the real-time simulator via a CAN.

14. The method according to claim 9, the real-time simulator being connected to the power supply of the simulation bench via Transmission Control Protocol/Internet Protocol (TCP/IP).

15. The method according to claim 9, the real-time simulator being connected to the machine-readable medium via TCP/IP.

16. The method according to claim 9, further comprising displaying, on a display in operable communication with the processor, the SOC results of the simulated BMS, the SOC data collected from the BMS having batteries connected thereto, and the error in the SOC data of the BMS having batteries connected thereto.

17. A system for testing a battery management system (BMS) having batteries connected thereto, the system comprising:
a simulation bench configured to connect to the BMS having batteries connected thereto;
a processor; and
a machine-readable medium in operable communication with the processor and having instructions stored thereon that, when executed by the processor, perform steps to generate state of charge (SOC) results of a simulated BMS, receive SOC data from the BMS having batteries connected thereto, compare the SOC results of the simulated BMS to the SOC data collected from the BMS having batteries connected thereto, and determine an error in the SOC data of the BMS having batteries connected thereto, thereby testing the BMS having batteries connected thereto,
the simulation bench comprising:
a battery cell simulator configured to connect to the BMS having batteries connected thereto;
a temperature simulator configured to connect to the BMS having batteries connected thereto;
a real-time simulator connected to the battery cell simulator and the temperature simulator;
a power supply connected to the real-time simulator;
a relay connected to the power supply of the simulation bench and configured to be operated using a supply voltage from the real-time simulator;
a resistor connected to the relay; and
a current sensor disposed between and connected to the relay and the resistor;
the system being a control-hardware-in-the-loop (CHIL) system,
the power supply of the simulation bench being a programmable direct current (DC) power supply,
the real-time simulator being connected to the relay and providing a relay voltage supply digital signal thereto,
the battery cell simulator being connected to the real-time simulator via a first Controller Area Network (CAN),
the temperature simulator being connected to the real-time simulator via a second CAN,
the real-time simulator being connected to the power supply of the simulation bench via Transmission Control Protocol/Internet Protocol (TCP/IP), and
the real-time simulator being connected to the machine-readable medium via TCP/IP.

* * * * *